(12) United States Patent
Celeste

(10) Patent No.: US 9,999,864 B2
(45) Date of Patent: Jun. 19, 2018

(54) METHOD OF MIXING A LIQUID IN A CONTAINER

(75) Inventor: Salvatore Albert Celeste, Swampscott, MA (US)

(73) Assignee: THE ADDITIVE ADVANTAGE, LLC, North Reading, MA (US)

( * ) Notice: Subject to any disclaimer, the term of this patent is extended or adjusted under 35 U.S.C. 154(b) by 0 days. days.

(21) Appl. No.: 13/589,094

(22) Filed: Aug. 18, 2012

(65) Prior Publication Data
US 2013/0176812 A1    Jul. 11, 2013

Related U.S. Application Data

(60) Provisional application No. 61/524,762, filed on Aug. 18, 2011.

(51) Int. Cl.
| | | |
|---|---|---|
| *B01F 13/02* | (2006.01) | |
| *A23L 2/40* | (2006.01) | |
| *A23L 2/52* | (2006.01) | |
| *A23L 2/56* | (2006.01) | |
| *B01F 13/00* | (2006.01) | |

(52) U.S. Cl.
CPC ............ *B01F 13/0222* (2013.01); *A23L 2/40* (2013.01); *A23L 2/52* (2013.01); *A23L 2/56* (2013.01); *B01F 13/002* (2013.01)

(58) Field of Classification Search
CPC .... B01F 13/02; B01F 13/0222; B01F 13/002; A23L 2/40; A23L 2/52; A23L 2/56
USPC ............................................... 426/78; 366/101
See application file for complete search history.

(56) References Cited

U.S. PATENT DOCUMENTS

| | | | | |
|---|---|---|---|---|
| 2,742,363 | A | * | 4/1956 | Hughes ........................... 426/78 |
| 2,915,176 | A | * | 12/1959 | O'Neil ............................ 426/86 |
| 3,526,316 | A | * | 9/1970 | Kalogris ....................... 206/217 |
| 4,186,215 | A | * | 1/1980 | Buchel ............................ 426/86 |
| 4,312,889 | A | * | 1/1982 | Melsheimer .................... 426/86 |
| 5,217,719 | A | * | 6/1993 | Yorozu et al. ................. 424/466 |
| 5,560,928 | A | * | 10/1996 | DeFelice .............. A61K 9/2081 424/466 |
| 2005/0175695 | A1 | * | 8/2005 | Castan ................. A61K 9/1635 424/468 |
| 2006/0008908 | A1 | * | 1/2006 | Giles ...................... A61K 31/19 435/455 |
| 2007/0120280 | A1 | * | 5/2007 | Anchordoquy .......... B01J 13/04 264/4.1 |
| 2008/0008751 | A1 | * | 1/2008 | Fox ............................... 424/464 |

(Continued)

OTHER PUBLICATIONS

Alka-Seltzer Original Drug Facts, Bayer Healthcare, www.alkaseltzer.com, accessed on Oct. 1, 2014, dated Jul. 31, 2012.*

*Primary Examiner* — Walter D. Griffin
*Assistant Examiner* — Marc C Howell
(74) *Attorney, Agent, or Firm* — Lisa M. Warren, Esq.; Stanley F. Chalvire, Esq.; Morse, Barnes-Brown & Pendleton, P.C.

(57) ABSTRACT

Presently, there exists a need for a method of mixing (stirring) the ingredients of a liquid preparation within a container without the introduction of any device or manual implement to agitate the contents mechanically. The purpose of the present invention is to provide a method a convenient, economical and effective method of mixing utilizing a chemical reaction to facilitate liquid motion in a container without the use of a stirring implement or external mechanical intervention.

10 Claims, 3 Drawing Sheets

(56) References Cited

U.S. PATENT DOCUMENTS

2009/0053366 A1* 2/2009 Hurwitz et al. ............... 426/73
2009/0095164 A1* 4/2009 Celeste .......................... 99/285

* cited by examiner

Fig. 2
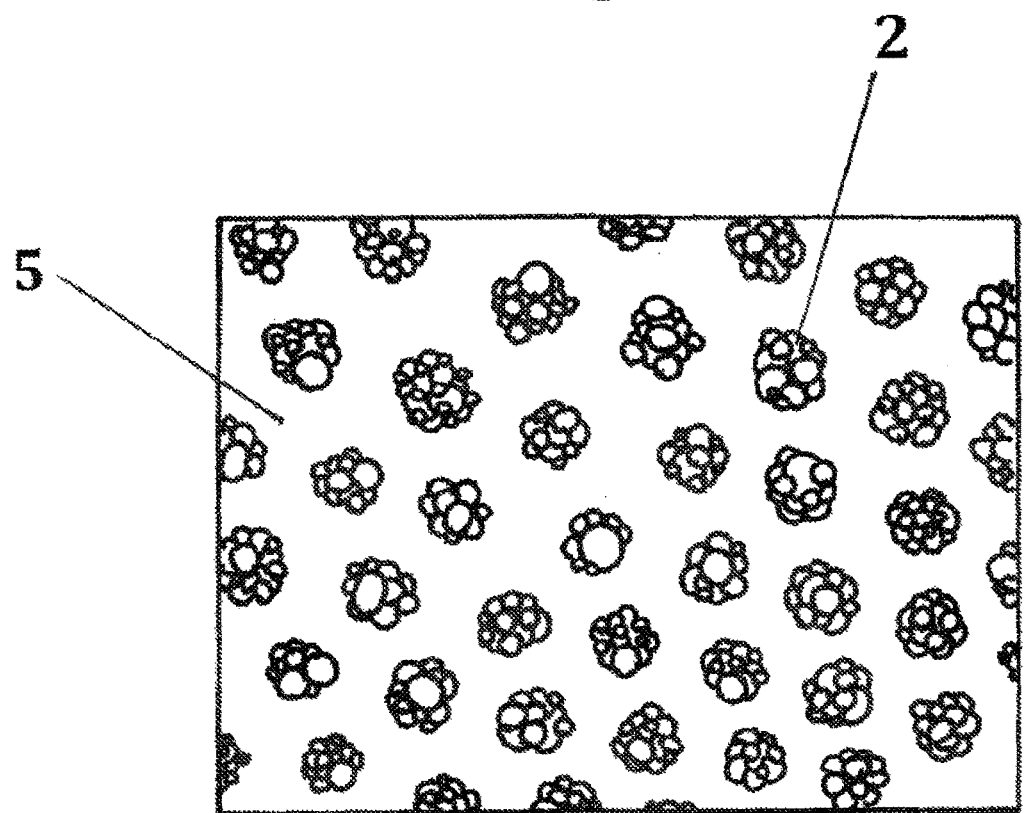
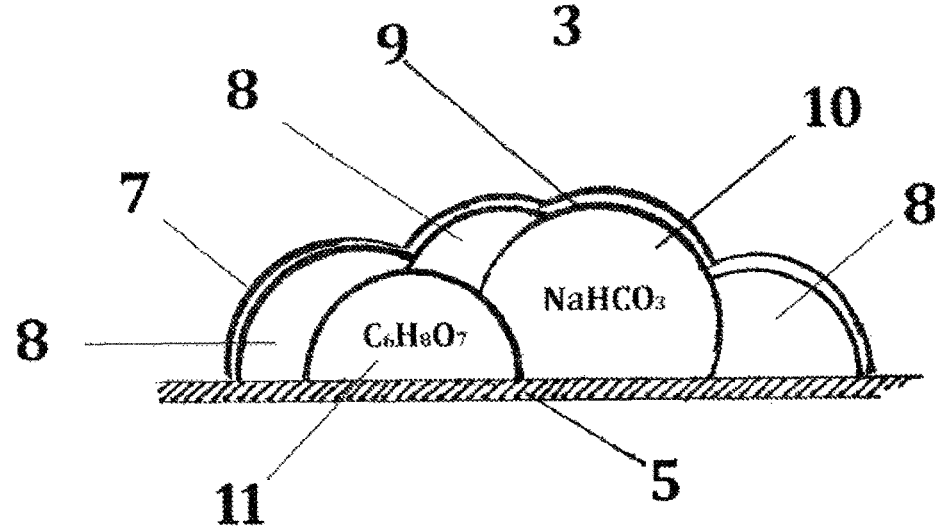
Fig. 3

METHOD OF MIXING A LIQUID IN A CONTAINER

FIELD OF THE INVENTION

This invention relates generally to a method of mixing or stirring instantly prepared beverages and other liquids for use in a disposable or re-useable container without the use of a stirring implement or other mechanical or manual intervention.

BACKGROUND OF THE INVENTION

For the invention described in publication WO2009/140018 (the entire teachings of which are incorporated herein by reference), where a multiplicity of microencapsulated compounds are affixed to the internal walls of a liquid container for latent release upon contact with a fluid, there exists a desire for a means of effectively and conveniently agitating the contents of said container, both during and after the latent release of the compound therein. As the intent of the referenced invention (publication WO2009/140018) is to provide a convenient method of providing an "instant" beverage or liquid preparation, it would therefore be inconvenient if final preparation would require a mechanical intervention such as stirring with an implement to prevent settling or stratification of the liquid contents prior to consumption. As stated in WO2009/140018, one particular embodiment provides:

"a method of "instant" preparation of a variety of beverage components in which the primary constituents of a beverage are encapsulated in a delivery system of the invention; when water or other appropriate liquid is introduced into the system, the fluid dissolves the microcapsules, releasing the constituent components into the solvent and creating a new beverage instantly."

Although the aforementioned embodiment is sufficient for many applications, it must be recognized that its basic embodiment does not further address the desire for "stirring" in the event that the latent released compounds comprising the entirety of the beverage or liquid preparation may be subject to separation, stratification or simply require distribution throughout the liquid medium in order to provide a satisfactory, well-combined result.

In addition, it has been observed that agitation of the liquid medium reduces the time required to reconstitute the beverage or liquid preparation significantly. This acceleration is primarily attributed to "shearing" forces created against the microcapsule clusters, both affixed and free floating, when the liquid is in some way circulated. The resultant disturbance in the liquid causes the microcapsule clusters to break down and separate from the container wall thus freeing the subsequently discreet microcapsules to be dissolved much faster and evenly distributed in the liquid medium. Therefore, the above-referenced invention (publication WO2009/140018) would be dramatically improved in several ways if the contents of the container could be conveniently agitated by a method other than mechanical intervention that could be simultaneously or independently incorporated into the container itself utilizing the same printing methods indicated in publication WO2009/140018.

SUMMARY OF THE INVENTION

The present invention provides a method of mixing a variety of liquid preparations without shaking, stirring or other mechanical agitation requiring an implement. This method is intended for use specifically in containers in which shaking the contents is not possible due to an open end or where stirring is simply undesirable or inconvenient (for example, in a cup or other container without a sealed closure).

The method lends itself well to those solids that when introduced into a liquid solvent such as water, may stratify in one or more layers once dissolved, such as solids that are negatively buoyant and sink to the bottom of the container to dissolve slowly. In the case of an open cup, shaking is not an option so an implement such as a spoon or stirring rod must be used to agitate the fluid sufficiently as to cause thorough mixing of the contents. For some products based on the microencapsulated delivery system described in the above-referenced patent application, it may be desirable in some instances to have the beverage "self-mix" once the liquid is introduced into the container. Although that application is specific to the microencapsulated delivery system, it must be understood that the technology described herein includes, but is not limited to, the mixing of liquids or solids in liquids, relative to latent release micro-capsules but may be applied wherever appropriate or desired and may also be used in otherwise re-sealable containers.

BRIEF DESCRIPTION OF THE DRAWINGS

FIG. 2 shows a magnified view (3) of the clusters of microcapsules and effervescent materials (2) affixed with binder to the cup wall (5) in a printed pattern.

FIG. 3 shows a detail of a typical example of a discreet cluster of encapsulated ingredients, in this case a flavored beverage. The cluster is affixed to the cup wall (5) by means of a polymer-binder coating that completely envelops all of the ingredients thus providing a protective barrier (7) as well as a means of adhering the ingredients to the substrate during the printing process. The clusters are comprised of flavoring and other beverage related ingredients (8) contained within microcapsules of gelatin, sugars, polymers or other materials suited for encapsulation or spray drying (9) that make up the beverage to be reconstituted. Other materials that do not require a separate encapsulation phase such as dry particulates like heat-treated sodium bicarbonate $NaHCO_3$ (10) and anhydrous citric acid (11) need only be protected by the binder to maintain an anhydrous condition.

DETAILED DESCRIPTION OF THE INVENTION

Figure 1:
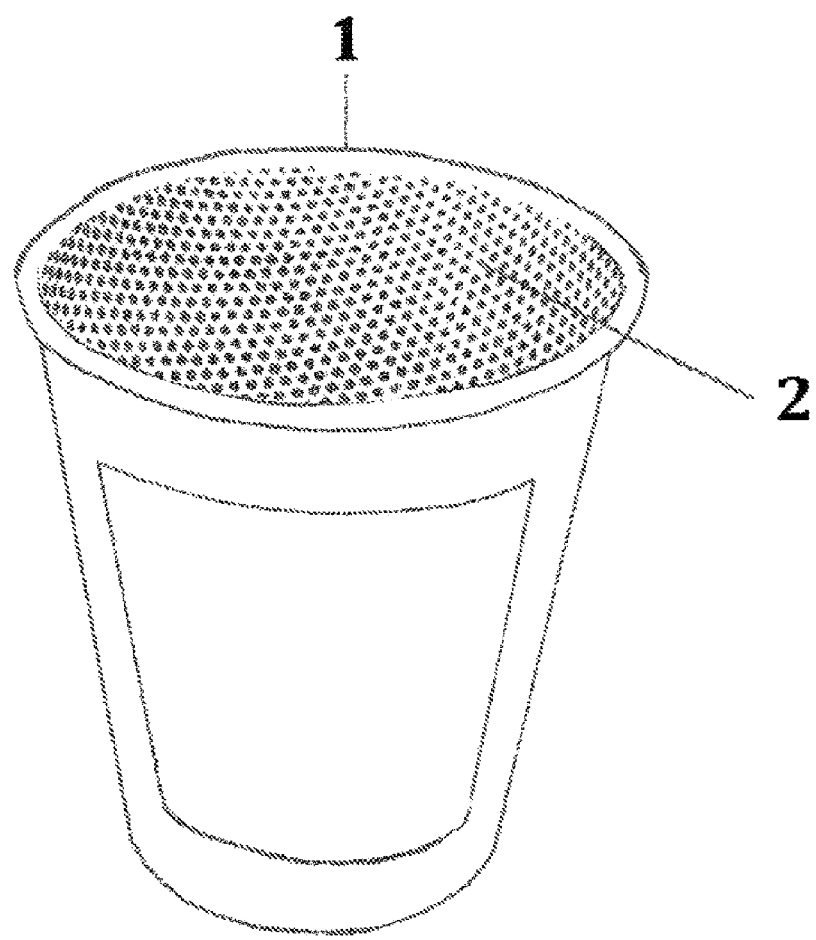
FIG. 1 shows an example of a typical open-ended container such as a common paper cup (1) having a plurality of microencapsulated ingredients including the effervescent components (2) affixed to the inside cup wall.
Figure 4:
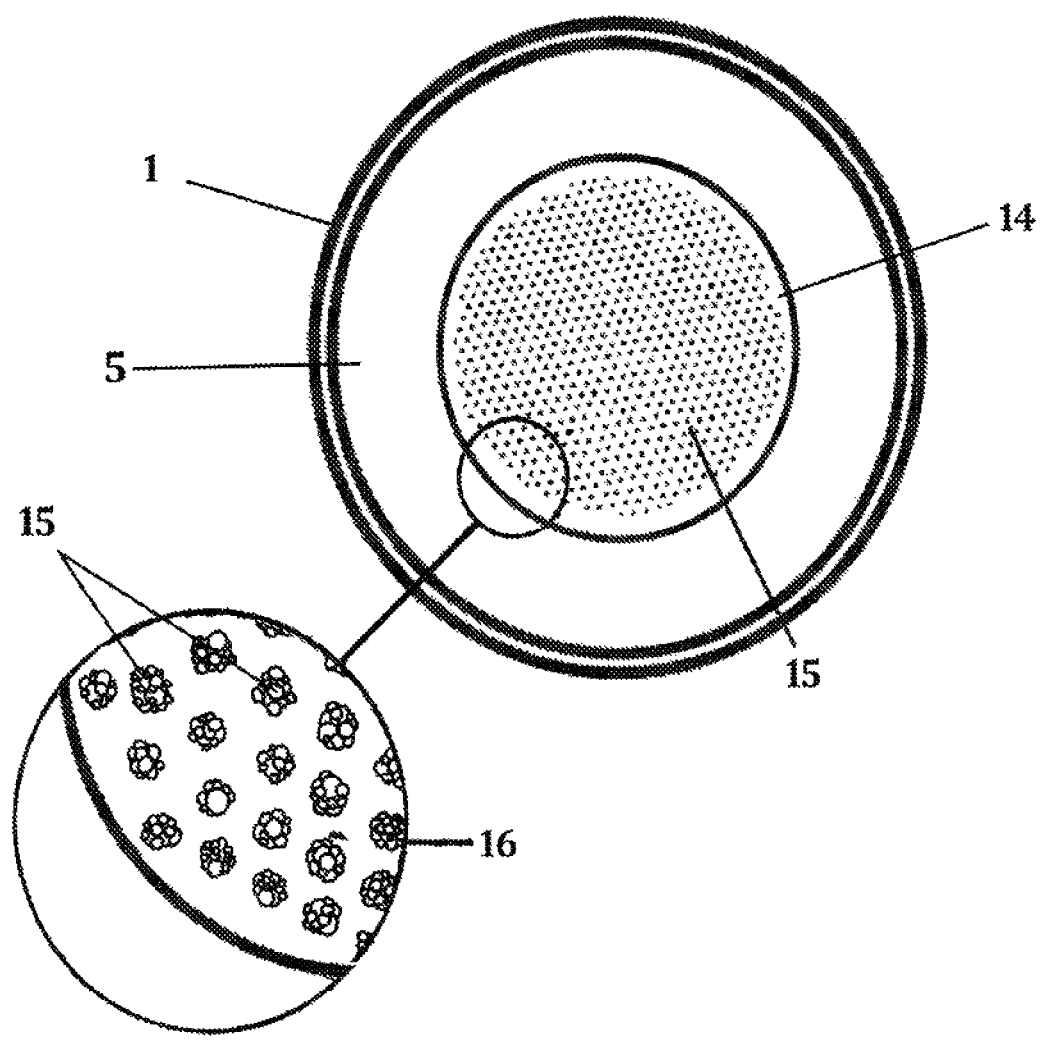
FIG. 4 shows a top-view of a typical paper cup (1) without printed clusters on the side-walls (5). This example depicts the entirety of the encapsulated materials and binder affixed only to the bottom surface of the cup (14). This configuration, having the clusters (15) printed only on the bottom, provides for the greatest path of travel, bottom to top, for the released $CO_2$ gas bubbles. This facilitates maximum disturbance and agitation of the liquid thus distributing the dissolved materials relatively evenly within the container as the bubbles create a convective motion that carries the particles from bottom to top repeatedly until completely dissolved. The magnified view (16) depicts the distribution of printed clusters (15) on the bottom inside surface of the cup.

Pertaining to the invention disclosed in WO2009/140018 (the entire teachings of which are incorporated herein by reference), there arises a desire to facilitate both a faster dissolution of the solids, enhanced infiltration of solvent into the micro-capsule clusters and disbursement of the inner-phase material throughout the liquid matrix. As the aforementioned micro-capsules are primarily used within an open container such as a cup, shaking is not an option, and other means of mechanical mixing are undesirable. The invention would therefore be enhanced if the contents could be stirred by other means that could also be imparted as a component of the cup itself. One important intended use of the invention is to create an instant beverage or other liquid where the contents are mixed without shaking or use of a stirring implement.

The scope of the present invention consists of a method of incorporating certain materials to induce a chemical reaction sufficient to cause the micro-capsule clusters to disintegrate and at the same time create sufficient turbulence within the liquid matrix to facilitate relatively thorough mixing. It is desirable that the reaction persists only as long as necessary to complete the mixing process and not impart any characteristics not otherwise related to the beverage or liquid itself. One method by which this is reduced to practice is as follows:

Incorporated into the amphiphilic polymer binder used to affix the microcapsule clusters to the substrate surface (as described in Publication WO2009/140018) is one or more of the following compounds: potassium citrate, sodium bicarbonate, potassium bicarbonate, and a weak acid such as citric, acetic or malic acids or any other suitable materials that will cause an effervescent release of carbon dioxide or other gas when dissolved in water. The amphiphilic binder may be created using Hydroxypropyl cellulose (HPC) or any other suitable heterogeneous polymers having both hydrophilic and hydrophobic parts that may be dissolved in organic solvents as well as water. Because the polymer may be liquified as a binder using an anhydrous solvent, it is possible to introduce the effervescent components into the matrix without reaction. Once the polymer is mixed with the micro-capsule slurry and deposited onto the substrate, all solvent is removed and all the materials mixed therein will remain in an inactive, anhydrous state until such time as it is exposed to liquid. In its preferred embodiment, the substrate is an instant beverage incorporated into a drinking cup. As water is introduced into that cup, the binder begins to dissolve, exposing the various effervescent materials and allowing them to react in an aqueous environment. The resultant release of carbon dioxide is short lived but is sufficient to cause a rapid deterioration of the micro-capsule clusters (resulting in faster dissolving due to greater surface exposure and shear forces when disbursed) and rapid convection-like turbulence sufficient to mix the beverage as the $CO_2$ bubbles progress from the bottom of the cup to the surface of the liquid.

Example

The example of accomplishing this by the preferred method is as follows:

A printable slurry is created, comprised of a plurality of micro-capsules containing an active, flavor, pharmaceutical or any other material intended for latent release mixed with a liquid film-forming material such as a vinylpyrrolidone-vinyl acetate copolymer and ethyl alcohol. In a 12 oz open container, to this premix is added 1.916 grams of heat-treated sodium bicarbonate and 1 gram of anhydrous citric acid (both additives being solid dry anhydrous particulates). In this embodiment, these quantities are sufficient to provide enough effervescent reaction to provide enough kinetic energy as the released $CO_2$ passes through the liquid to distribute the micro-capsules, mix the beverage and achieve a stoichiometric balanced reaction of the effervescent components. It is important to note that this slurry must be prepared within a completely anhydrous environment to avoid premature activation of effervescent components. In this embodiment, the completed slurry is applied to a paper or plastic substrate, for example, the inside of a common drinking cup, in a well distributed pattern and in sufficient quantity to produce a complete instant beverage when mixed with the appropriate amount of water. The printed slurry is then air, UV or heat-dried to stabilize the component solids to the substrate. A small amount of Propylene Glycol may be added to promote adhesion and retard drying. The resulting enhanced beverage can be expected to be effectively mixed within seconds of hydration without the use of a stirring implement. Upon introduction of water into the cup, the binder/encapsulation film quickly dissolves, exposing the effervescent components to the liquid thus causing the desired mixing action.

What is claimed is:

1. A vessel or container comprising: (a) one or more compounds affixed by a binder to an inside surface of the vessel or container; and (b) one or more microcapsules affixed by the binder to the inside surface of the vessel or container; wherein the one or more compounds are incorporated into the binder; wherein the one or more compounds are capable of causing a reaction-induced disturbance in a liquid upon introduction of the liquid into the vessel or container for the purpose of mixing the contents therein; wherein the binder comprises an amphiphilic polymer; wherein the binder envelops the one or more compounds; and wherein the binder maintains the one or more compounds in an anhydrous state prior to the introduction of the liquid into the vessel or container.

2. The vessel or container of claim 1 wherein the one or more compounds affixed thereto when hydrated create an effervescent reaction sufficient to cause a mixing action in a liquid as the resultant release of $CO_2$ gas bubbles pass through the liquid to the surface.

3. The vessel or container of claim 1 wherein the reaction-induced disturbance is initiated by the introduction of a liquid into the container causing the dissolution of the binder and the exposure of said compounds thus allowing them to react.

4. The vessel or container of claim 1 wherein the amphiphilic polymer comprises a vinylpyrrolidone-vinyl acetate copolymer.

5. The vessel or container of claim 1 wherein said compounds comprise an acid.

6. The vessel or container of claim 1 wherein said compounds comprise a carbonate-containing compound.

7. The vessel or container of claim 6 wherein the carbonate-containing compound has been heat-treated to cause a micron layer of inactive material on the surface of the carbonate to inhibit premature reaction when in intimate contact with an acid prior to hydration.

8. The vessel or container of claim 1 wherein the binder is comprised substantially of the amphiphilic polymer.

9. The vessel or container of claim 1 wherein the amphiphilic polymer comprises Hydroxypropyl cellulose.

10. The vessel or container of claim 1, wherein the reaction of the one or more compounds with the liquid causes the reaction-induced disturbance in the liquid.

* * * * *